United States Patent [19]

Fendt

[11] Patent Number: 4,848,903
[45] Date of Patent: Jul. 18, 1989

[54] METHOD AND APPARATUS FOR MEASURING THE OPTICAL AXIS OF A GUIDE BEAM PROJECTOR

[75] Inventor: Alfred Fendt, Munich, Fed. Rep. of Germany

[73] Assignee: Messerschmitt-Boelkow-Blohm GmbH, Munich, Fed. Rep. of Germany

[21] Appl. No.: 111,407

[22] Filed: Oct. 20, 1987

[30] Foreign Application Priority Data

Oct. 21, 1986 [DE] Fed. Rep. of Germany ....... 3635689

[51] Int. Cl.⁴ .......................... G01C 1/00; G01B 11/26
[52] U.S. Cl. .................................... 356/152; 244/3.13
[58] Field of Search ...................... 356/150, 153, 152; 89/91.06; 244/3.13, 3.16

[56] References Cited

U.S. PATENT DOCUMENTS 3,989,385 11/1976 Dill et al. ............................ 356/152
4,014,482 3/1977 Esker et al. .
4,300,736 11/1981 Miles .

FOREIGN PATENT DOCUMENTS 2536878 7/1978 Fed. Rep. of Germany .
3439273 11/1985 Fed. Rep. of Germany .

Primary Examiner—Stephen C. Buczinski
Attorney, Agent, or Firm—W. G. Fasse; D. H. Kane, Jr.

[57] ABSTRACT

The optical axis of a guide beam projector operating in accordance with the reticle field modulation method, is measured by projecting the guide beam through a retro-reflector into the optical axis of a sighting instrument. When the two axes are coincident the two axes are harmonized. A non-coincidence is measured and evaluated in an electronic signal processing circuit to provide information to be used for harmonizing the two axes, for example, by a respective automatic adjustment.

4 Claims, 2 Drawing Sheets

FIG. 5 COINCIDENCE IMPULSE FROM 6b

MULTIPLIER CIRCUIT → PRODUCT SIGNAL

REFERENCE IMPULSE FROM 7c

METHOD AND APPARATUS FOR MEASURING THE OPTICAL AXIS OF A GUIDE BEAM PROJECTOR

FIELD OF THE INVENTION

The invention relates to a method and an apparatus for measuring the optical axes of a guide beam projector operating in accordance with the reticle image field modulation, whereby the guide beam is imaged into a sighting instrument by means of a retro-reflector.

DESCRIPTION OF THE PRIOR ART

Different methods are known for checking or testing whether the axes of optical instruments extend in parallel to each other, for example in binoculars, heat imaging devices, and guide beam transmitters or projectors. U.S. Pat. No. 4,014,482 discloses an apparatus operating in accordance with a modified reticle image field modulation process. Independently of the manner in which the axes are caused to optically coincide or how the axes are coupled for the harmonizing prior art devices depend on a point-by-point scanning of the guide beam by means of a testing detector. Stated differently, in the prior art methods a detector is located in the plane in which the retro-reflected guide beam is focussed. Such a detector comprises a needle hole shutter which receives a tiny area of the entire guide beam in complete analogy to the receiver for the guide beam in a flying body. This type of conventional testing of the parallelity or harmony of optical axes makes it necessary that the entire ranging electronic components of the receiver in the flying body are also present in the transmitter, whereby the transmitter becomes heavy, complex, and expensive.

U.S. Pat. No. 4,300,736 (Miles) describes a fire control system for guiding, e.g., artillery shells, wherein a relative rotational motion between a modulated beam of infrared energy and a spinning projectile, is used to determine the displacement of such a projectile during flight from the centerline of the beam for correcting the trajectory of the projectile in accordance with an intended target. The deviation of the projectile from an intended trajectory is detected and a deviation signal is used to make a correction to bring the projectile back onto the intended trajectory.

German Patent (DE-PS) No. 3,439,273 discloses an apparatus for harmonizing the lines of sight or sighting lines of two optical devices, whereby the guide beam is also used for the harmonizing. A deviation signal is produced for controlling optical rotational wedges in such a way that an automatic harmonization of the guide beam with the axes for a daylight channel and for a heat imaging channel is accomplished.

German Patent Publication (DE-AS) No. 2,536,878 discloses an electrooptical sighting instrument using a reflected beam, for example in a laser distance measuring apparatus including adjustment means for axes harmonization. These axes harmonization adjustment means use a special prism which is attachable to the apparatus in front of the several optics to bridge the spacing between the several optics.

OBJECTS OF THE INVENTION

In view of the foregoing it is the aim of the invention to achieve the following objects singly or in combination:

to eliminate the disadvantages of the prior art by providing a substantially simplified electronic circuitry for the axes harmonizing system;

to make sure that the optical axes of the two system components, namely, the guide beam projector and the optical sighting instrument are aligned in parallel to each other with the highest precision;

to make sure that the parallelism between said two axes is maintained under all operating conditions;

to provide a simple, yet highly effective automatic axes testing and aiming system for use in a ground based station of a tracking system; and to simplify the signal processing of such a tracking system with regard to the axes harmonization.

SUMMARY OF THE INVENTION

The method according to the invention for the measuring of the optical axis of a guide beam projector operating in accordance with the reticle image field modulation is characterized by the following steps. The guide beam is imaged through a retroreflector into a sighting instrument. The guide beam profile is scanned by means of a cross-slotted shutter and measured by means of a beam or radiation detector for ascertaining the direction of the optical axis. During the transmitting phase of the guide beam, the center of a modulating shutter is caused to move along a circular path around the axes of another cross-slotted shutter forming part of the sighting instrument, whereby the axes of the sighting instrument and the guide beam axes coincide so that for each rotation of the modulating shutter four coincidence pulses are formed. These coincidence pulses are then multiplied with a corresponding reference impulse for calculating the deviation of the guide beam axis from its rated position.

The apparatus for performing the foregoing method is primarily characterized in that the modulator shutter is located in the beam path of the guide beam projector or transmitter and that the modulator shutter is equipped to produce a specific guide beam pattern in the form of transparent and opaque sectors.

Advantages of the invention are seen in that the electronic circuit for the signal processing comprises primarily a signal multiplier which produces a product output signal that can be directly evaluated for the present purposes. Further, the invention features make sure that the optical axes of the guide beam projector and of the sighting or aiming device are aligned in parallel to each other with the highest precision which is maintained under all operating conditions.

BRIEF DESCRIPTION OF THE DRAWINGS

In order that the invention may be clearly understood, it will now be described, by way of example, with reference to the accompanying drawings, wherein:

FIG. 5 is a block circuit diagram for an electronic circuit used for the present signal processing.

DETAILED DESCRIPTION OF A PREFERRED EXAMPLE EMBODIMENT AND OF THE BEST MODE OF THE INVENTION

Figure 1:
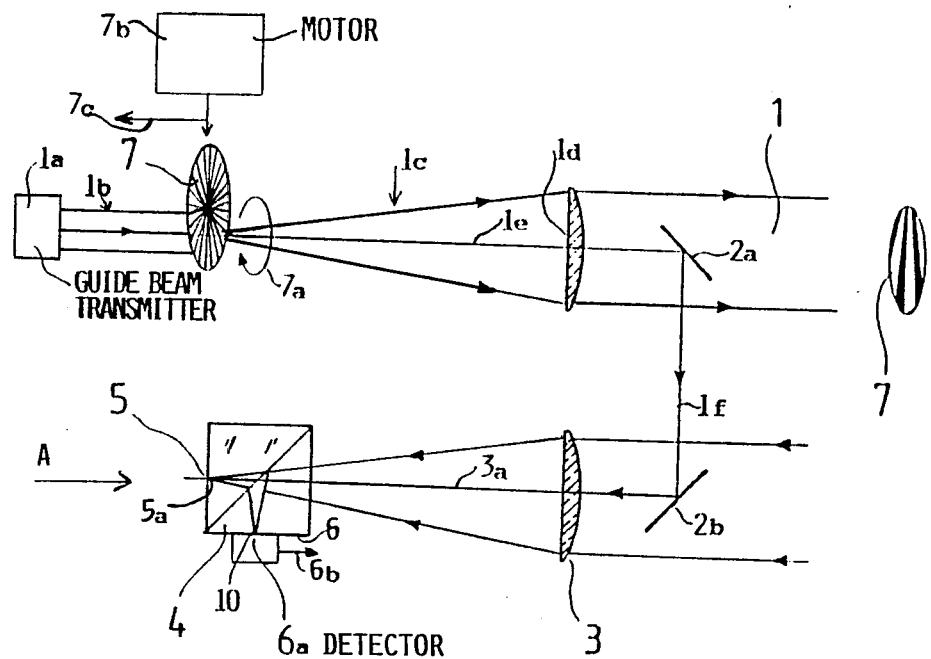
FIG. 1 is a schematic illustration of the structural features of a system for the axes harmonization in accordance with the method of the invention.
Figure 6:
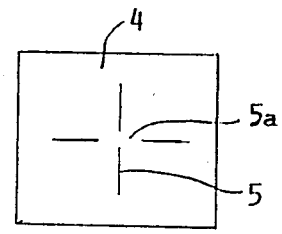
FIG. 6 is a view in the direction of the arrow A in FIG. 1.
Figure 2:
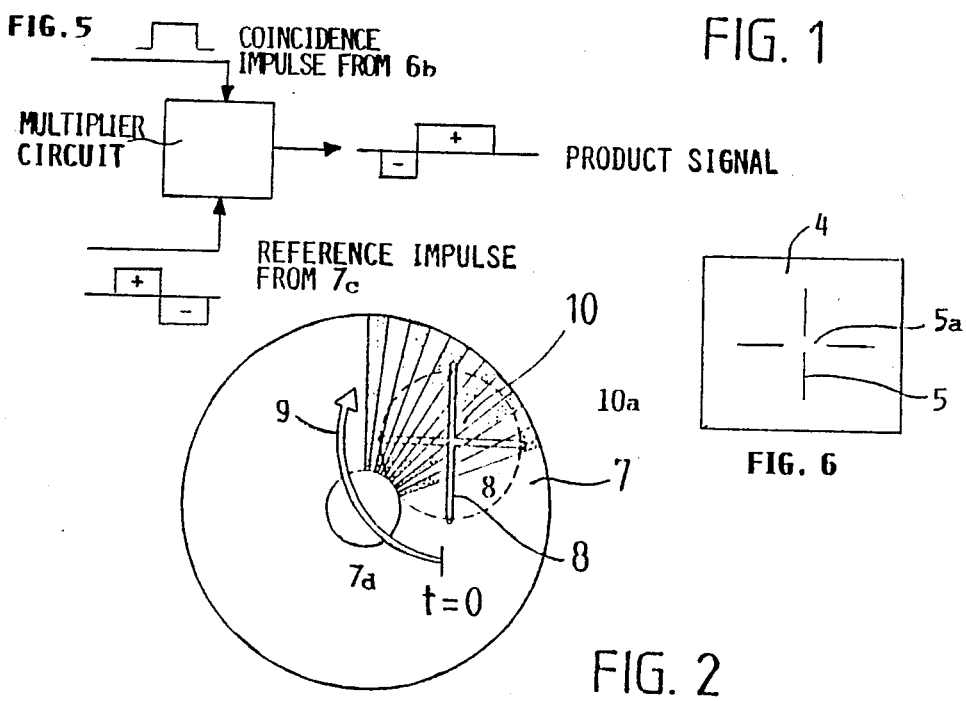
FIG. 2 is a schematic illustration of an image of a modulation shown in alignment with a cross-slotted aperture for illuminating a beam detector, shown in FIG. 1, according to the invention.

Referring to FIG. 1, a guide beam transmitter 1a having a guide beam axis 1e produces a guide beam 1b which is passed through a modulation shutter 7 conventionally driven by a motor 7b for rotating the modulation shutter 7 as indicated by the arrow 7a. An arrow 7c indicates schematically that reference pulses may be derived, for example, from the rotation of a drive shaft of the motor 7b. The beam 1c coming through the modulation shutter 7 passes through a lens 1d to form the guide beam 1 which is directed to a target 17 having an illumination pattern projected thereon as shown. A first retro-reflector 2a is located in the path of the guide beam 1 and deflects a partial guide beam 1f to a second reflector 2b which reflects the partial guide beam 1f along the sighting axis 3a of a sighting instrument 3. The sighting or aiming instrument 3 passes the reflected partial guide beam 1f along its optical axes 3a into a beam splitter cube 4 carrying on its backside a line marker 5 forming a reticle. The conjugated image plane 6 of the beam splitter 4 is equipped with a cross-slotted aperture 10 having slots 8 defining a first center 10a as best seen in FIG. 2. The cross-slotted aperture 10 passes the profile of the guide beam, as a result of the beam splitting, to a beam detector 6a for providing four optical coincidence impulses for each revolution of the modulation shutter 7. The reticle 5 has a second center 5a as best seen in FIG. 6. A conventional beam detector 6a is located to receive said coincidence impulses through the cross-slotted aperture 10. An output 6b of the beam detector 6a provides respective electrical coincidence impulses for measuring a direction of the guide beam axis. The first center 10a of the cross-slit aperture 10 is located in said image plane 6 in a mirror-symmetrical position relative to the second reticle center 6a.

FIG. 2 illustrates the form of the reticle modulation shutter 7 which is located in the path of the guide beam 1b generated by the transmitter or projector 1a. The modulation shutter 7 is equipped with a plurality of alternating transparent and opaque sectors for producing a specific guide beam pattern according to the invention. The number of alternating transparent and opaque sectors may be, for example, within the range of about 120 to about 600 sectors. The circular central zone 7d of the modulation shutter 7 is illuminated by the guide beam 1b on the backside of the modulation shutter 7 so that the central zone 7d defines the cross-section of the guide beam 1c which is projected by the lens 1d onto the target 17. Simultaneously, the beam is imaged through the retro-reflectors 2a and 2b onto the objective of the sighting instrument 3 and into the plane of the cross-slotted aperture 10 located in the conjugated image plane 6 of the beam splitter cube 4 to direct the optical impulses produced by the slots 8 of the aperture 10 onto the beam sensor 6a for producing respective electrical conicidence impulses at its output 6b. The beam splitter cube 4 separates visible radiation from the guide beam radiation thus acting as a filter for the guide beam.

While the transmitter is operating, the central zone 7d of the modulating shutter 7 driven by the motor 7b, moves along a circular path 9 around the guide beam axis 1e which coincides with the axis or center 10a of the cross-slotted aperture 10. if the projector is adjusted exactly, the axis of the guide beam and the axis of the cross-slotted aperture 10 are exactly in parallel to each other. For analyzing, it is possible to replace the motion of the modulation shutter 7 by a respective oppositely rotating motion of the cross-slotted aperture 10. In that case, one obtains the size of the beam signal at the detector by superimposing the two shutter structures.

As shown in FIG. 2, one of the two slots forming the cross-slot 8 is fully illuminated only when the axis of the superimposed transparent sectors of the modulation shutter 7 extends exactly parallel to the respective slot axes. In all other positions the slot is only illuminated about 50%.

Figure 3:
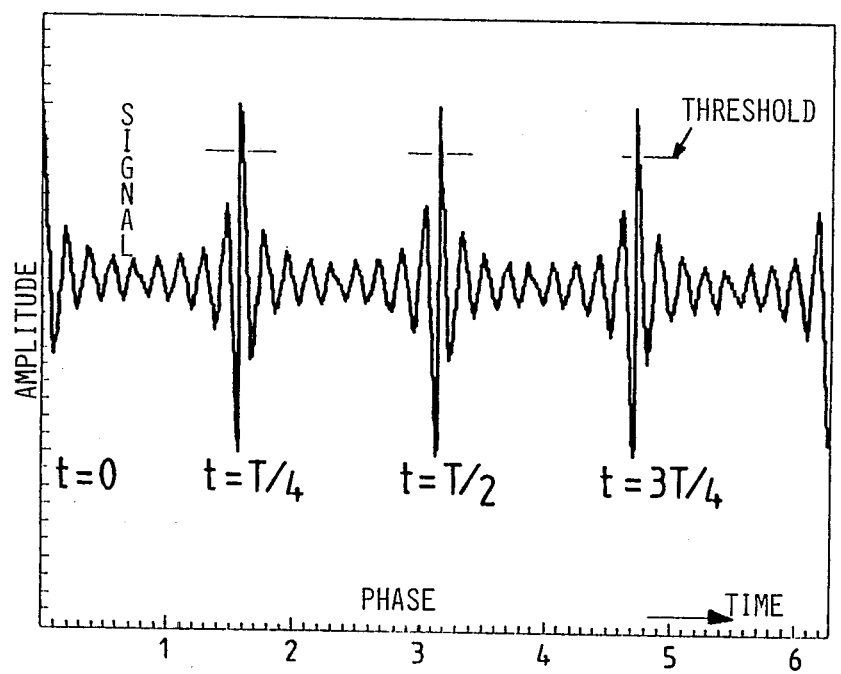
FIG. 3 shows a pulse diagram representing the typical pattern of an output signal of a detector employed according to the invention.

As shown in FIG. 3, when the ratio of the width of the slots 8 to the width of the sectors in the modulation shutter 7 or the length of the slots 8 to the radial length of the sectors in the modulating shutter is suitably selected, it is possible to emphasize the signal impulse which marks the coincidence as compared to all other impulses during a period of the rotation of the modulation shutter 7. During one revolution of the modulation shutter 7 four coincidences occur.

Figure 4:
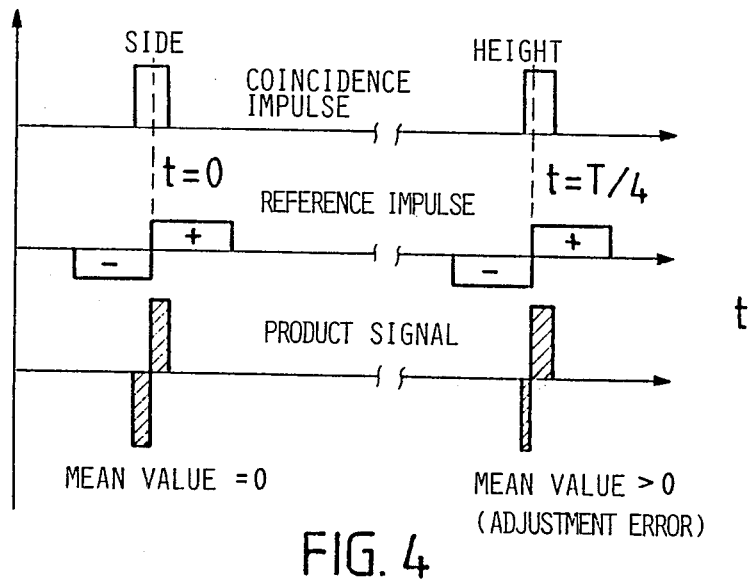
FIG. 4 is a schematic illustration for explaining the signal processing according to the invention ncluding coincidence pulses, reference pulses, and the respective product signal.

FIG. 4 shows that four coincidence impulses are marked at fixed time locations corresponding to $t=0$ when the shutter 7 begins on revolution and the other coincidence impulses marking 90°, 180°, and 270°. If the coincidence impulses as actually sensed and appearing at the beam sensor output 6b are multiplied with the respective coincidence impulse derived, for example, for the rotation of the drive shaft of the motor 7b, the resulting product signal provides a measure for the deviation of a guide beam axis from its rated position defined by the center 10a of the slots 8 of the cross-slotted shutter 10 shown in FIG. 2. When the adjustment is exact, the cross-slot axis or rated axis through 10a coincides with the modulator rotational axes. In the case, the mean or averaged product signal becomes zero. A positive value of the averaged or mean product value indicates a deviation in one direction and a negative value indicates a deviation in the other direction, either upwardly or downwardly or to the right or to the left.

FIG. 5 illustrates the above relationship. The multiplier circuit is of conventional construction.

Although the invention has been described with reference to specific example embodiments, it will be appreciated, that it is intended to cover all modifications and equivalents within the scope of the appended claims.

What I claim is:

1. A method for measuring an optical axis of a guide beam generated by a guide beam projector during a transmitting phase, said guide beam projector operating in accordance with a reticle image field modulation process, comprising the following steps:
   (a) projecting said guide beam (1b) through a modulation shutter (8) having a shutter axis, onto retro-reflector means (2a, 2b) for directing said guide beam into a sighting device (3) having a sighting axis,
   (b) revolving said shutter axis of said modulation shutter (7) at least during said transmitting phase around a center (10a) of a cross-sloted aperture (10) so that a center portion (7d) of said modulation shutter (7) revolves along a circular path (9) having said center (10a) which determines the position of said optical guide beam axis as parallel to said sighting axis when said guide beam projector is correctly adjusted.

(c) scanning a profile of said guide beam by said revolving of said modulation shutter axis relative to said cross-slotted aperture (10) located so that its crossing coincides with said center (10a) to provide four optical coincidence impulses for each revolution of said modulation shutter (7), (d) sensing said optical coincidence impulses by means of a beam detector (6a) to provide respective electrical coincidence impulses which indicate a direction of said guide beam axis, (e) producing in response to said revolving of said axis of said modulation shutter (7) reference impulses corresponding to said four coincidence impulses, and (f) electrically multiplying each of said coincidence impulses in a coincidence circuit with the respective reference impulse to produce a product signal which provides an indication of a deviation of said optical guide beam axis from its rated position.

2. An apparatus for measuring an optical axis of a guide beam generated by a guide beam projector during a transmitting phase, said guide beam projector operating in accordance with a reticle image field modulation process, comprising modulation shutter means (7) arranged in said guide beam of said guide beam projector for modulating said guide beam, means for revolving said modulation shutter means (7), a sighting device (3) having a sighting axis for correcting a direction of said guide beam, retro-reflector means (2a, 2b) for directing said guide beam into said sighting device, beam splitter means (4) arranged in said sighting axis for dividing said guide beam, said beam splitter means comprising a reticle (5), aperture means (10) located in a conjugated image plane (6) of said beam splitter means, and beam detector means located to receive beams from said beam splitter means.

3. The apparatus of claim 2, wherein said modulation shutter (7) comprises a plurality of opaque or dark sectors and of light transparent sectors alternating with said opaque or dark sectors.

4. The apparatus of claim 2, wherein said aperture means (10) has cross-slots (8) defining a first center (10a) at an intersection of said cross-slots (8), said reticle (5) defining a further center (5a), said first center (10a) being arranged mirror-symmetrically relative to said further center (5a).

* * * * *